Patented Jan. 16, 1923.

1,442,318

UNITED STATES PATENT OFFICE.

CHARLES T. WHITTIER, OF JERSEY CITY, NEW JERSEY, ASSIGNOR TO ROYAL BAKING POWDER COMPANY, OF NEW YORK, N. Y., A CORPORATION OF NEW JERSEY.

PROCESS OF PREPARING DRY GRANULAR CALCIUM ACID PHOSPHATE.

No Drawing.   Application filed May 21, 1920.   Serial No. 383,310.

*To all whom it may concern:*

Be it known that I, CHARLES T. WHITTIER, a citizen of the United States, residing at Jersey City, in the county of Hudson and State of New Jersey, have invented certain new and useful Improvements in Processes of Preparing Dry Granular Calcium Acid Phosphate, of which the following is a specification.

This invention relates to a process of preparing dry granular calcium acid phosphate and has for its principal objects to reduce the cost of manufacture and produce a better product. Calcium acid phosphate is largely used as the acid ingredient, or part of the acid ingredient, in baking powders and effervescent mixtures. Particularly for use in such mixtures it is important that the particles of the phosphate be of suitable size and condition. The size of the particles has heretofore been attained by grinding and bolting. The combination of suitable size with proper condition has not heretofore been fully attained because the particles of phosphate have been too dense and heavy as compared with the particles of bicarbonate of sodium and filler used in the mixture, with the result that in transit the phosphate has tended to separate out, thus impairing the value of the mixture. By the practice of the present invention the phosphate may be produced in particles of suitable size and condition and at reduced cost.

Calcium acid phosphate has heretofore been produced by sundry different processes involving the conversion of the tri-calcium into the mono-calcium by different means. While the invention contemplates the use of any of these as alternatives, it will be sufficient to mention one of the known processes as an illustration. The rock or bone ash containing the tri-calcium phosphate may be mixed with dilute sulphuric acid, and the resulting calcium sulphate gangue and other impurities filtered off, leaving the mono-calcium phosphate, and more or less free phosphoric acid in solution.

The usual practice is to evaporate the solution until on cooling the mass is semi-solid, and to neutralize the free phosphoric acid in a suitable mixing or kneading apparatus. The resulting product, containing a small amount of moisture, is dried, ground and bolted.

Repeated attempts have been made to neutralize the free phosphoric acid in dilute solutions of mono-calcium phosphate, and to evaporate such solutions. On account of the characteristic tendency toward decomposition of this solution, resulting in the separation of free phosphoric acid, and the formation of dicalcic phosphate, especially under the continued application of heat, it has not been possible, under the processes heretofore known, to produce a satisfactory acid phosphate of calcium by this means.

According to the present invention, the solution of mono-calcium phosphate, obtained by any of the known processes in which the free phosphoric acid has been neutralized, is sprayed into heated air or purified water gases of sufficient volume to remove the moisture. The density of the solution and the pressure used in spraying it are regulated so as to obtain particles of the various desired sizes suited to the different purposes for which the product may be used and these particles may by the practice of the invention be made in weight more comparable with the particles of other substances mixed with them to make baking powder. The solution should be maintained at a temperature low enough to minimize the separation of free phosphoric acid. Atomizing or spray apparatus is well known and any suitable type may be used.

I claim:—

The process of preparing dry granular acid calcium phosphate which comprises making a solution containing acid calcium phosphate, spraying said solution into a volume of warm air to remove the moisture therefrom and regulating the pressure used in spraying the solution according to the desired size of the particles of calcium phosphate.

CHARLES T. WHITTIER,